(12) United States Patent
Cunha et al.

(10) Patent No.: US 10,670,268 B2
(45) Date of Patent: Jun. 2, 2020

(54) GAS TURBINE ENGINE COMBUSTOR LINER PANEL

(71) Applicant: United Technologies Corporation, Hartford, CT (US)

(72) Inventors: Frank J. Cunha, Avon, CT (US); Stanislav Kostka, Shrewsbury, MA (US)

(73) Assignee: Raytheon Technologies Corporation, Farmington, CT (US)

( * ) Notice: Subject to any disclaimer, the term of this patent is extended or adjusted under 35 U.S.C. 154(b) by 629 days.

(21) Appl. No.: 14/893,378

(22) PCT Filed: May 23, 2014

(86) PCT No.: PCT/US2014/039378
§ 371 (c)(1),
(2) Date: Nov. 23, 2015

(87) PCT Pub. No.: WO2015/023339
PCT Pub. Date: Feb. 19, 2015

(65) Prior Publication Data
US 2016/0102861 A1    Apr. 14, 2016

Related U.S. Application Data

(60) Provisional application No. 61/826,554, filed on May 23, 2013.

(51) Int. Cl.
*F23R 3/00* (2006.01)
*F23R 3/50* (2006.01)
*F23R 3/06* (2006.01)

(52) U.S. Cl.
CPC ............... *F23R 3/002* (2013.01); *F23R 3/06* (2013.01); *F23R 3/50* (2013.01); *F05D 2260/2212* (2013.01); *F23R 2900/03042* (2013.01); *F23R 2900/03044* (2013.01); *F23R 2900/03045* (2013.01); *Y02T 50/675* (2013.01)

(58) Field of Classification Search
CPC .... F28F 1/124; F28F 1/10; F28F 1/105; F28F 1/12; F28F 2001/027; F28F 13/12; F01D 5/18–189; F23R 3/002–005; F23R 2900/03043–03045; F28D 9/005; F05D 2260/221; F05D 2260/2214; F05D 2260/22141
See application file for complete search history.

(56) References Cited

U.S. PATENT DOCUMENTS 5,353,865 A    10/1994 Adiutori et al.
5,538,394 A *   7/1996 Inomata ................. F01D 5/187
6,098,420 A *   8/2000 Furukawa ............... F25B 15/06
                                                            62/484

(Continued)

OTHER PUBLICATIONS

EP search report for EP14836500 dated Apr. 7, 2016.

*Primary Examiner* — Gerald L Sung
*Assistant Examiner* — Rene D Ford
(74) *Attorney, Agent, or Firm* — Getz Balich LLC

(57) ABSTRACT

A liner panel for a combustor of a gas turbine engine includes a multiple of heat transfer augmentors which extend from a cold side thereof. At least one of the multiple of heat transfer augmentors includes a first heat transfer augmentation feature with a second heat transfer augmentation feature stacked thereon.

16 Claims, 14 Drawing Sheets

(56) References Cited

U.S. PATENT DOCUMENTS

| | | | |
|---|---|---|---|
| 7,694,522 B2* | 4/2010 | Nakae | F23R 3/002 60/752 |
| 2002/0005274 A1 | 1/2002 | Beeck et al. | |
| 2003/0213250 A1 | 11/2003 | Pacheco-Tougas et al. | |
| 2005/0034399 A1* | 2/2005 | Pidcock | F23R 3/002 |
| 2005/0106020 A1 | 5/2005 | Bunker et al. | |
| 2006/0005543 A1* | 1/2006 | Burd | F23M 5/085 60/752 |
| 2007/0144711 A1* | 6/2007 | Rausing | F28R 3/004 |
| 2008/0066888 A1 | 3/2008 | Tong | |
| 2010/0132921 A1 | 6/2010 | Moskal | |
| 2010/0247284 A1 | 9/2010 | Gregg et al. | |
| 2011/0016717 A1* | 1/2011 | Morrison | B22F 3/105 29/889.72 |
| 2011/0033312 A1 | 2/2011 | Lee et al. | |
| 2012/0240584 A1 | 9/2012 | Berdou et al. | |
| 2013/0089434 A1 | 4/2013 | Simpson et al. | |
| 2014/0020393 A1* | 1/2014 | Nakamata | F23R 3/002 60/754 |
| 2015/0345305 A1* | 12/2015 | Allen | F01D 5/188 416/95 |
| 2016/0025010 A1 | 1/2016 | Soucy et al. | |

\* cited by examiner

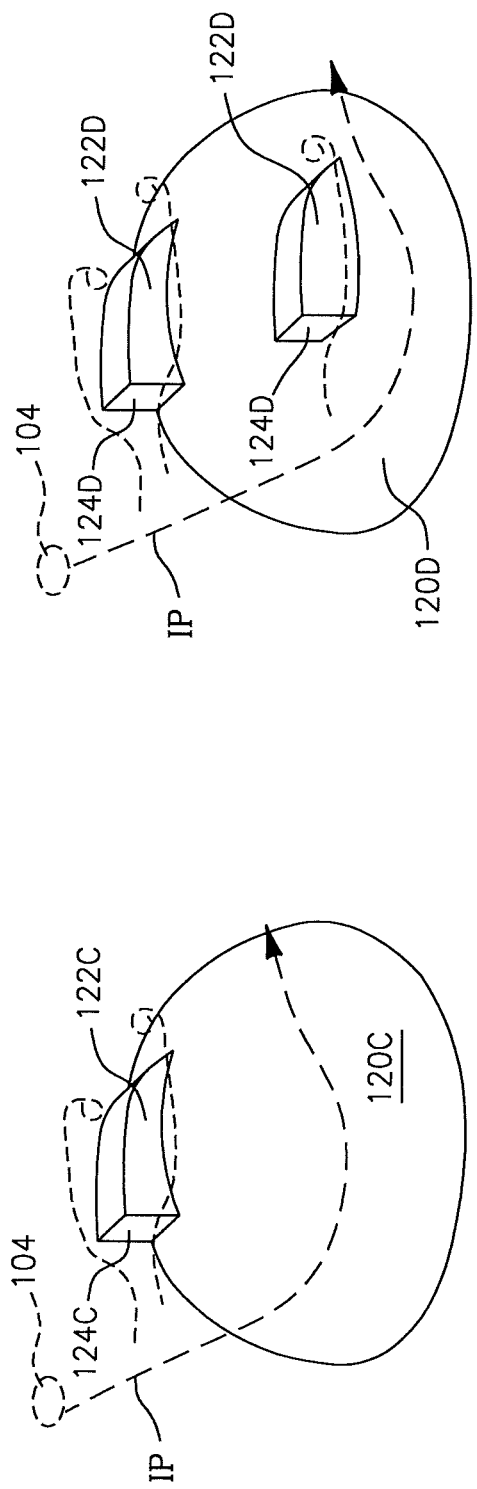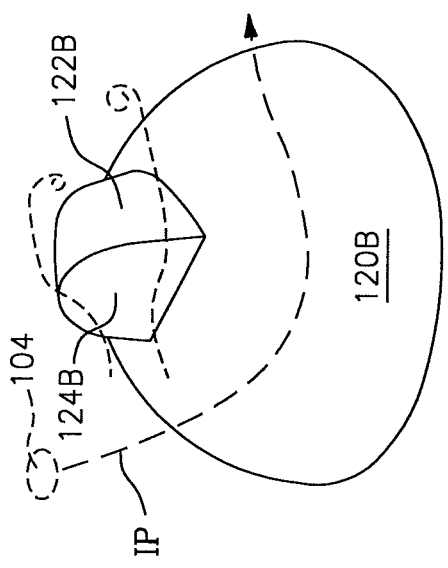
FIG. 16
FIG. 15
FIG. 14

GAS TURBINE ENGINE COMBUSTOR LINER PANEL

CROSS-REFERENCE TO RELATED APPLICATIONS

This application claims priority to PCT Patent Application No. PCT/US14/39378 filed May 23, 2014, which claims priority to U.S. Provisional Patent Appln. No. 61/826,554 filed May 23, 2013, which are is hereby incorporated herein by reference in their entireties.

BACKGROUND

The present disclosure relates to a gas turbine engine and, more particularly, to a combustor section therefor.

Gas turbine engines, such as those that power modern commercial and military aircraft, generally include a compressor section to pressurize an airflow, a combustor section to burn a hydrocarbon fuel in the presence of the pressurized air, and a turbine section to extract energy from the resultant combustion gases.

Advanced engine cycles require the combustor section to operate at high compressor exit temperatures. A survey of typical flight envelope for these cycles adds a further requirement that the high compressor exit temperatures exist with reduced supply pressure at high altitude. These operational conditions result in relatively high thermal radiation heat loads, particularly at the combustor bulkhead.

SUMMARY

A liner panel is provided for a combustor of a gas turbine engine according to one disclosed non-limiting embodiment of the present disclosure. The liner panel includes a first heat transfer augmentation feature with a second heat transfer augmentation feature stacked thereon.

In a further embodiment of the present disclosure, the first heat transfer augmentation feature may be a generally hemi-spherical protuberance.

In a further embodiment of any of the foregoing embodiments of the present disclosure, the second heat transfer augmentation feature may be a generally hemi-spherical protuberance.

In a further embodiment of any of the foregoing embodiments of the present disclosure, the second heat transfer augmentation feature may be a partial hemi-spherical protuberance with a flat surface.

In a further embodiment of any of the foregoing embodiments of the present disclosure, the second heat transfer augmentation feature may be a ramp with a flat surface.

In a further embodiment of any of the foregoing embodiments of the present disclosure, the second heat transfer augmentation feature may be a rectilinear member with a flat surface.

In a further embodiment of any of the foregoing embodiments of the present disclosure, the second heat transfer augmentation feature may be an airfoil.

In a further embodiment of any of the foregoing embodiments of the present disclosure, the liner panel may include at least one hole within a valley formed by a subset of the multiple of heat transfer augmentors.

In a further embodiment of any of the foregoing embodiments of the present disclosure, the at least one hole may be a film cooling hole.

A combustor of a gas turbine engine is provided according to another disclosed non-limiting embodiment of the present disclosure. The combustor includes a liner panel mounted to a shell. The liner panel includes a multiple of heat transfer augmentors which extend from a cold side thereof to extend toward the shell. At least one of the multiple of heat transfer augmentors includes a first heat transfer augmentation feature with a second heat transfer augmentation feature stacked thereon.

In a further embodiment of any of the foregoing embodiments of the present disclosure, a plurality of studs may extend from a cold side of the liner panel.

In a further embodiment of any of the foregoing embodiments of the present disclosure, the first heat transfer augmentation feature may be a generally hemi-spherical protuberance.

In a further embodiment of any of the foregoing embodiments of the present disclosure, the liner panel may include at least one hole within a valley formed by a subset of the multiple of heat transfer augmentors.

In a further embodiment of any of the foregoing embodiments of the present disclosure, the second heat transfer augmentation feature may be a generally hemi-spherical protuberance.

In a further embodiment of any of the foregoing embodiments of the present disclosure, the second heat transfer augmentation feature may be a partial hemi-spherical protuberance with a flat surface.

In a further embodiment of any of the foregoing embodiments of the present disclosure, the second heat transfer augmentation feature may be a ramp with a flat surface.

In a further embodiment of any of the foregoing embodiments of the present disclosure, the second heat transfer augmentation feature may be a rectilinear member with a flat surface.

In a further embodiment of any of the foregoing embodiments of the present disclosure, the second heat transfer augmentation feature may be an airfoil.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows:

FIG. 14 is a cold side view of a combustor liner panel with one of a multiple of heat transfer augmentors according to another disclosed non-limiting embodiment;

FIG. 15 is a cold side view of a combustor liner panel with one of a multiple of heat transfer augmentors according to another disclosed non-limiting embodiment;

FIG. 16 is a cold side view of a combustor liner panel with one of a multiple of heat transfer augmentors according to another disclosed non-limiting embodiment;

DETAILED DESCRIPTION

Figure 1:
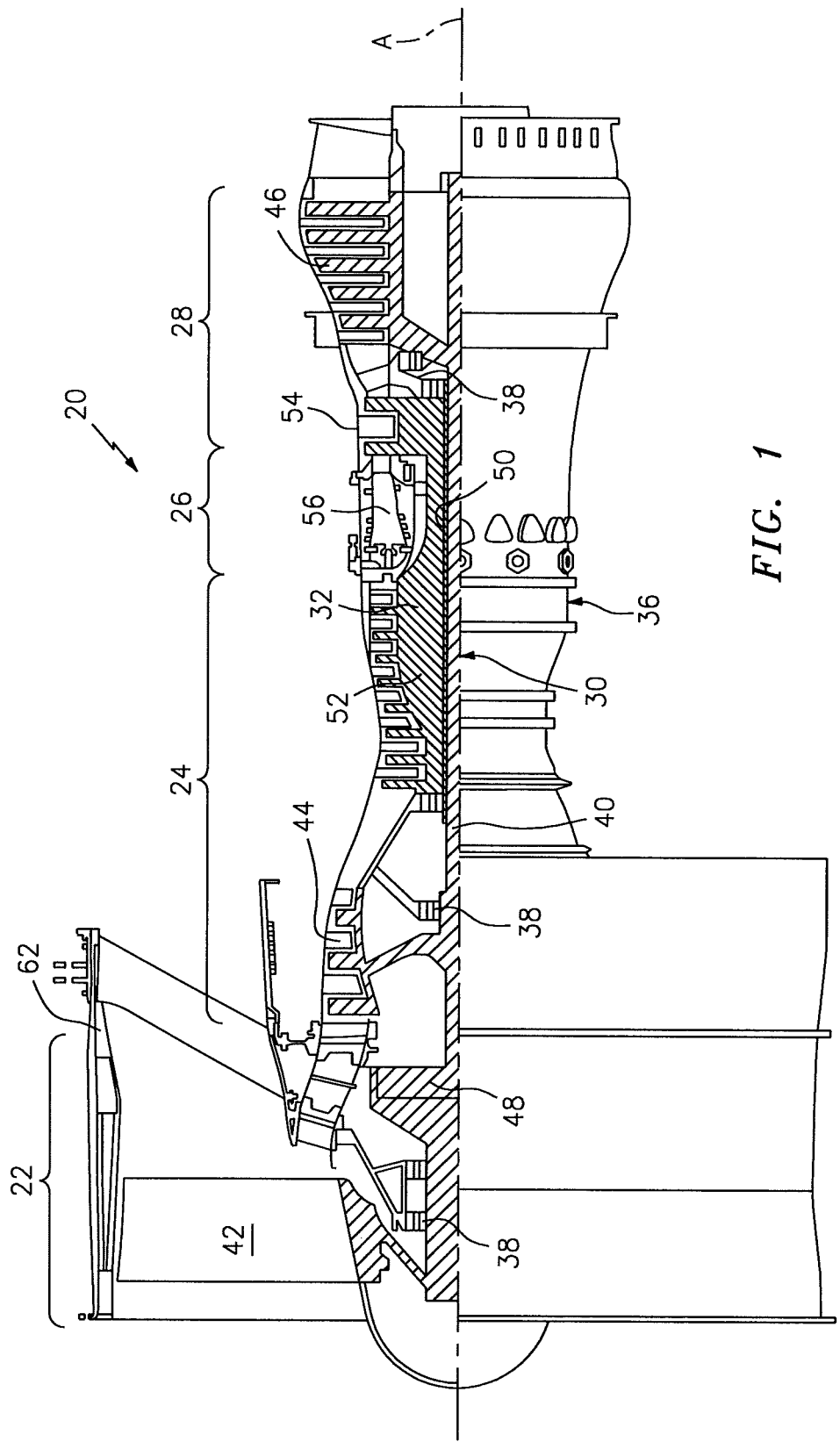
FIG. 1 is a schematic cross-section of an example gas turbine engine architecture.
Figure 2:
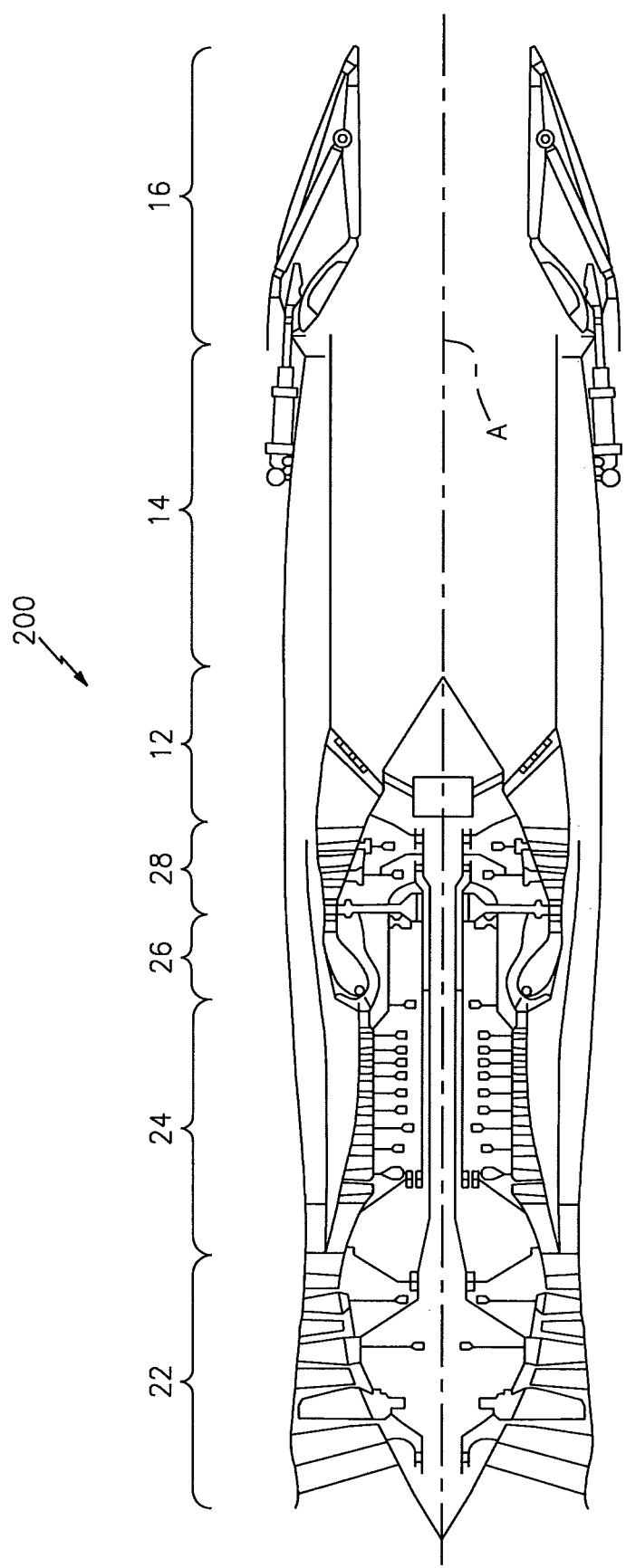
FIG. 2 is a schematic cross-section of another example gas turbine engine architecture.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. Referring to FIG. 2, alternative engine architectures 200 might include an augmentor section 12, an exhaust duct section 14 and a nozzle section 16 in addition to the fan section 22', the compressor section 24', the combustor section 26' and the turbine section 28' among other systems or features. Referring again to FIG. 1, the fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be understood that the concepts described herein are not limited to use with turbofans as the teachings may be applied to other types of turbine engines such as a turbojets, turboshafts, and three-spool (plus fan) turbofans wherein an intermediate spool includes an intermediate pressure compressor ("IPC") between a low pressure compressor ("LPC") and a high pressure compressor ("HPC"), and an intermediate pressure turbine ("IPT") between a high pressure turbine ("HPT") and a low pressure turbine ("LPT").

The engine 20 generally includes a low spool 30 and a high spool 32 mounted for rotation about an engine central longitudinal axis A relative to an engine static structure 36 via several bearing structures 38. The low spool 30 generally includes an inner shaft 40 that interconnects a fan 42, a low pressure compressor ("LPC") 44 and a low pressure turbine ("LPT") 46. The inner shaft 40 may drive the fan 42 directly, or through a geared architecture 48 as illustrated in FIG. 1 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor ("HPC") 52 and a high pressure turbine ("HPT") 54. A combustor 56 is arranged between the high pressure compressor 52 and the high pressure turbine 54. The inner shaft 40 and the outer shaft 50 are concentric and rotate about the engine central longitudinal axis A, which is collinear with their longitudinal axes.

Core airflow is compressed by the LPC 44 then the HPC 52, mixed with the fuel and burned in the combustor 56, then expanded over the HPT 54 and the LPT 46. The turbines 54, 46 rotationally drive the respective low spool 30 and high spool 32 in response to the expansion. The main engine shafts 40, 50 are supported at a plurality of points by the bearing structures 38 within the static structure 36. It should be understood, however, that various bearing structures 38 at various locations may alternatively or additionally be provided.

In one non-limiting example, the gas turbine engine 20 is a high-bypass geared aircraft engine. In a further example, the gas turbine engine 20 bypass ratio is greater than about six (6:1). The geared architecture 48 can include an epicyclic gear train, such as a planetary gear system or other gear system. The example epicyclic gear train has a gear reduction ratio of greater than about 2.3, and in another example is greater than about 2.5:1. The geared turbofan enables operation of the low spool 30 at higher speeds which can increase the operational efficiency of the LPC 44 and the LPT 46 and render increased pressure in a fewer number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting embodiment, the bypass ratio of the gas turbine engine 20 is greater than about ten (10:1), the fan diameter is significantly larger than that of the LPC 44, and the LPT 46 has a pressure ratio that is greater than about five (5:1). It should be understood, however, that the above parameters are only exemplary of one embodiment of a geared architecture engine and that the present disclosure is applicable to other gas turbine engines including direct drive turbofans.

In one embodiment, a significant amount of thrust is provided by the bypass flow path due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of ("Tram"/518.7)$^{0.5}$. The Low Corrected Fan Tip Speed according to one non-limiting embodiment of the example gas turbine engine 20 is less than about 1150 fps (351 m/s).

Figure 3:
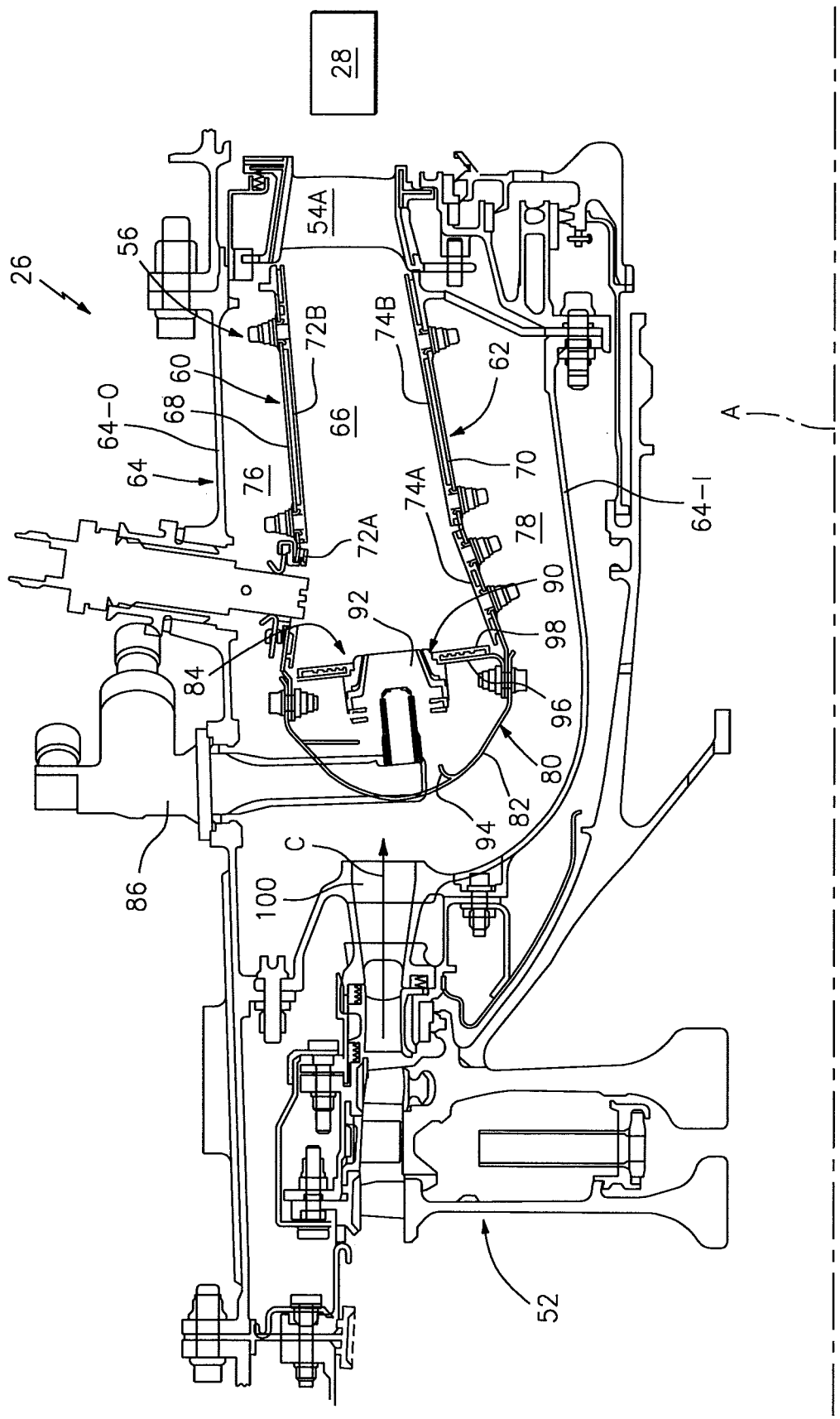
FIG. 3 is an expanded longitudinal schematic sectional view of a combustor section according to one non-limiting embodiment that may be used with the example gas turbine engine architectures shown in FIGS. 1 and 2.

With reference to FIG. 3, the combustor section 26 generally includes a combustor 56 with an outer combustor liner assembly 60, an inner combustor liner assembly 62 and a diffuser case module 64. The outer combustor liner assembly 60 and the inner combustor liner assembly 62 are spaced apart such that a combustion chamber 66 is defined therebetween. The combustion chamber 66 is generally annular in shape.

The outer combustor liner assembly 60 is spaced radially inward from an outer diffuser case 64-O of the diffuser case module 64 to define an outer annular plenum 76. The inner combustor liner assembly 62 is spaced radially outward from an inner diffuser case 64-I of the diffuser case module 64 to define an inner annular plenum 78. It should be understood that although a particular combustor is illustrated, other combustor types with various combustor liner arrangements will also benefit herefrom. It should be further understood that the disclosed cooling flow paths are but an illustrated embodiment and should not be limited only thereto.

The combustor liner assemblies 60, 62 contain the combustion products for direction toward the turbine section 28. Each combustor liner assembly 60, 62 generally includes a respective support shell 68, 70 which supports one or more liner panels 72, 74 mounted to a hot side of the respective support shell 68, 70. Each of the liner panels 72, 74 may be generally rectilinear and manufactured of, for example, a nickel based super alloy, ceramic or other temperature resistant material and are arranged to form a liner array. In one disclosed non-limiting embodiment, the liner array includes a multiple of forward liner panels 72A and a multiple of aft liner panels 72B that are circumferentially staggered to line the hot side of the outer shell 68 (also shown in FIG. 4). A multiple of forward liner panels 74A and a multiple of aft liner panels 74B are circumferentially staggered to line the hot side of the inner shell 70 (also shown in FIG. 4).

The combustor 56 further includes a forward assembly 80 immediately downstream of the compressor section 24 to receive compressed airflow therefrom. The forward assembly 80 generally includes an annular hood 82, a bulkhead assembly 84, a multiple of fuel nozzles 86 (one shown) and a multiple of fuel nozzle guides 90 (one shown). Each of the fuel nozzle guides 90 is circumferentially aligned with one of the hood ports 94 to project through the bulkhead assembly 84. Each bulkhead assembly 84 includes a bulkhead support shell 96 secured to the combustor liner assemblies 60, 62, and a multiple of circumferentially distributed bulkhead liner panels 98 secured to the bulkhead support shell 96 around the central opening 92.

The annular hood 82 extends radially between, and is secured to, the forwardmost ends of the combustor liner assemblies 60, 62. The annular hood 82 includes a multiple of circumferentially distributed hood ports 94 that accommodate the respective fuel nozzle 86 and introduce air into the forward end of the combustion chamber 66 through a central opening 92. Each fuel nozzle 86 may be secured to the diffuser case module 64 and project through one of the hood ports 94 and through the central opening 92 within the respective fuel nozzle guide 90.

The forward assembly 80 introduces core combustion air into the forward section of the combustion chamber 66 while the remainder enters the outer annular plenum 76 and the inner annular plenum 78. The multiple of fuel nozzles 86 and adjacent structure generate a blended fuel-air mixture that supports stable combustion in the combustion chamber 66.

Opposite the forward assembly 80, the outer and inner support shells 68, 70 are mounted to a first row of Nozzle Guide Vanes (NGVs) 54A in the HPT 54. The NGVs 54A are static engine components which direct core airflow combustion gases onto the turbine blades of the first turbine rotor in the turbine section 28 to facilitate the conversion of pressure energy into kinetic energy. The core airflow combustion gases are also accelerated by the NGVs 54A because of their convergent shape and are typically given a "spin" or a "swirl" in the direction of turbine rotor rotation. The turbine rotor blades absorb this energy to drive the turbine rotor at high speed.

Figure 4:
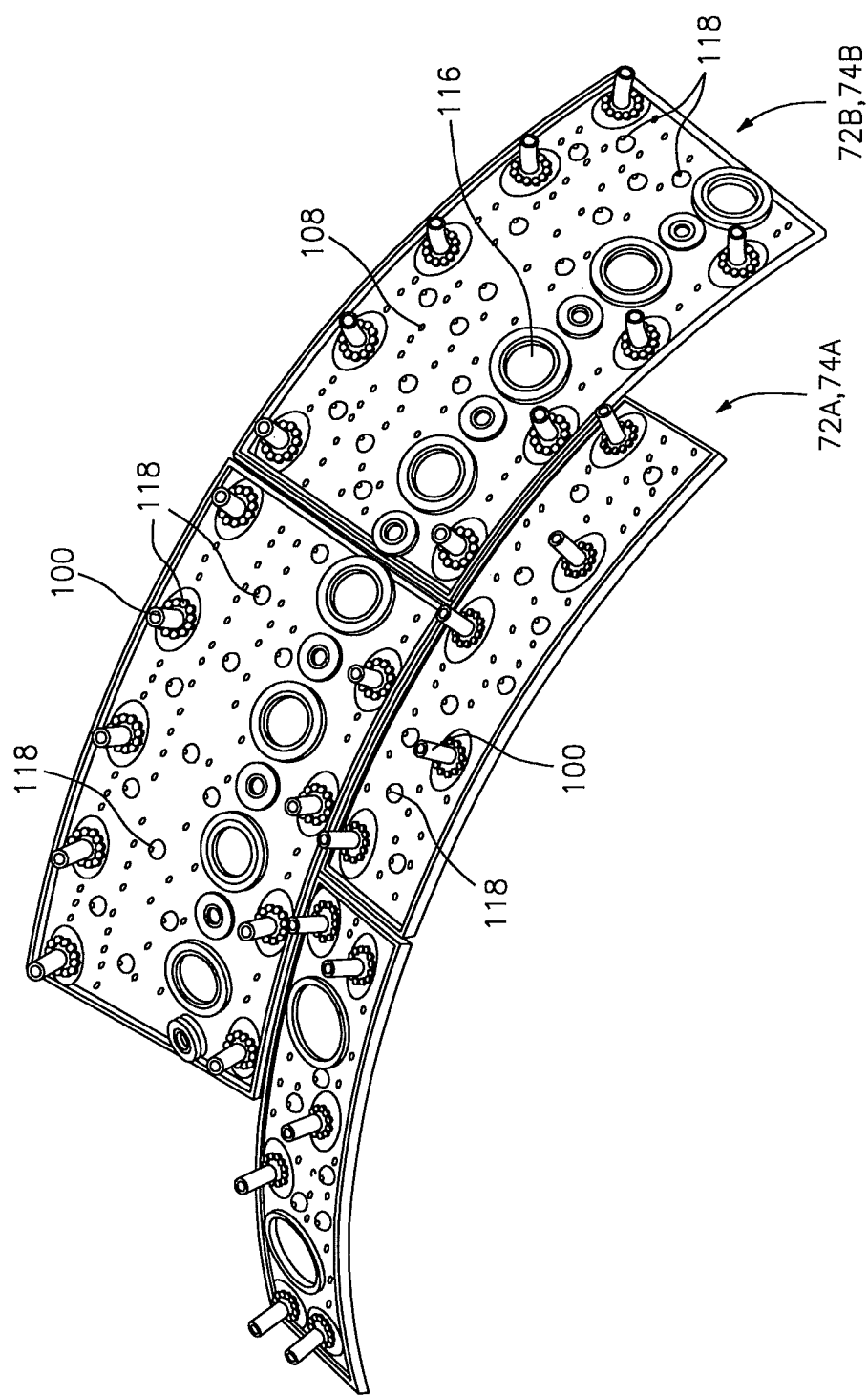
FIG. 4 is an expanded perspective view of a liner panel array from a cold side.
Figure 5:
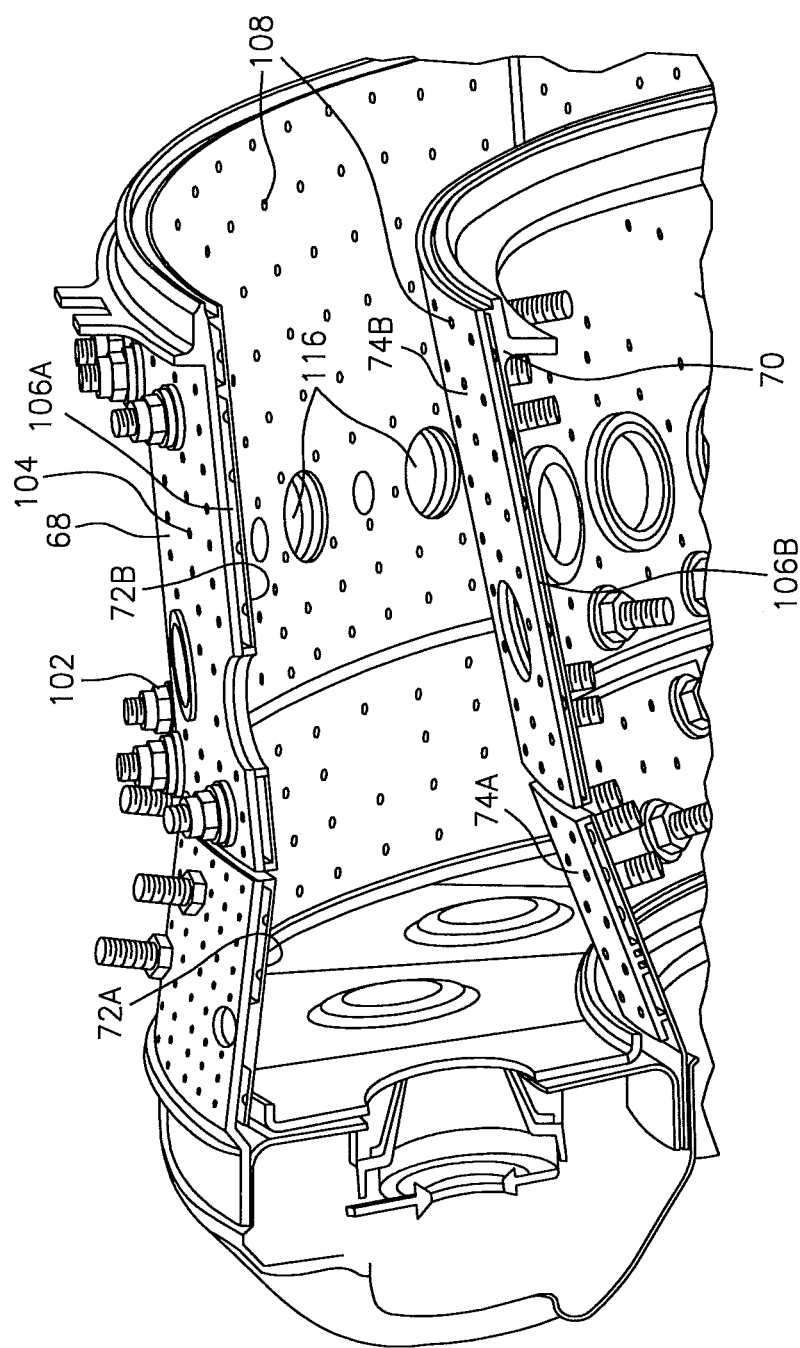
FIG. 5 is a perspective partial longitudinal sectional view of the combustor section.

With reference to FIG. 4, a multiple of studs 100 extend from the liner panels 72, 74 so as to permit the liner panels 72, 74 to be mounted to their respective support shells 68, 70 with fasteners 102 such as nuts (shown in FIG. 5). That is, the studs 100 project rigidly from the liner panels 72, 74 and through the respective support shells 68, 70 to receive the fasteners 102 at a threaded distal end section thereof.

A multiple of cooling impingement holes 104 penetrate through the support shells 68, 70 to allow air from the respective annular plenums 76, 78 to enter cavities 106A, 106B (also shown in FIG. 6) formed in the combustor liner assemblies 60, 62 between the respective support shells 68, 70 and liner panels 72, 74. The cooling impingement holes 104 are generally normal to the surface of the liner panels 72, 74. The air in the cavities 106A, 106B provides cold side impingement cooling of the liner panels 72, 74 that is generally defined herein as heat removal via internal convection.

A multiple of cooling film holes 108 penetrate through each of the liner panels 72, 74. The geometry of the film holes, e.g. diameter, shape, density, surface angle, incidence angle, etc., as well as the location of the holes with respect to the high temperature main flow also contributes to effusion film cooling. The combination of impingement holes 104 and film holes 108 may be referred to as an Impingement Film Float Liner assembly.

The cooling film holes 108 allow the air to pass from the cavities 106A, 106B defined in part by a cold side 110 of the liner panels 72, 74 to a hot side 112 of the liner panels 72, 74 and thereby facilitate the formation of a film of cooling air along the hot side 112. The cooling film holes 108 are generally more numerous than the impingement holes 104 to promote the development of a film cooling along the hot side 112 to sheath the liner panels 72, 74. Film cooling as defined herein is the introduction of a relatively cooler airflow at one or more discrete locations along a surface exposed to a high temperature environment to protect that surface in the immediate region of the airflow injection as well as downstream thereof.

A multiple of dilution holes 116 may penetrate through both the respective support shells 68, 70 and liner panels 72, 74 along a common axis (FIG. 4). For example only, in a Rich-Quench-Lean (R-Q-L) type combustor, the dilution holes 116 are located downstream of the forward assembly 80 to quench the hot gases by supplying cooling air into the combustor. The hot combustion gases slow towards the dilution holes 116 and may form a stagnation point at the leading edge which becomes a heat source and may challenge the durability of the liner panels 72, 74 proximate this location. At the trailing edge of the dilution hole, due to interaction with dilution jet, hot gases form a standing vortex pair that may also challenge the durability of the liner panels 72, 74 proximate this location.

Some engine cycles and architectures demand that the gas turbine engine combustor 56 operate at relatively high compressor exit temperatures aft of the HPC 52—referred to herein as T3. As further perspective, T1 is a temperature in front of the fan section 22; T2 is a temperature at the leading edge of the fan 42; T2.5 is the temperature between the LPC 44 and the HPC 52; T3 is the temperature aft of the HPC 52; T4 is the temperature in the combustion chamber 66; T4.5 is the temperature between the HPT 54 and the LPT 46; and T5 is the temperature aft of the LPT 46 (see FIG. 1).

Figure 8:
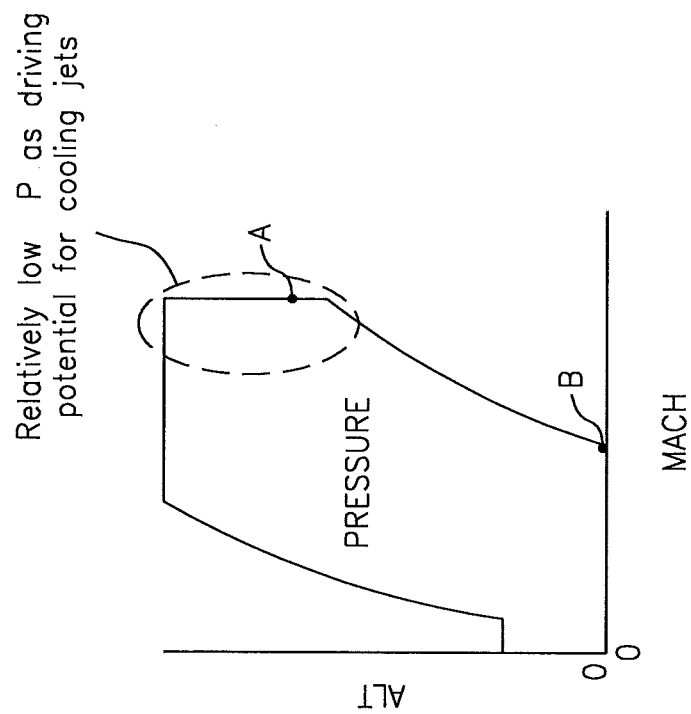
FIG. 8 is a graphical representation of a combustor discharge pressure with respect to an aircraft flight envelope.
Figure 7:
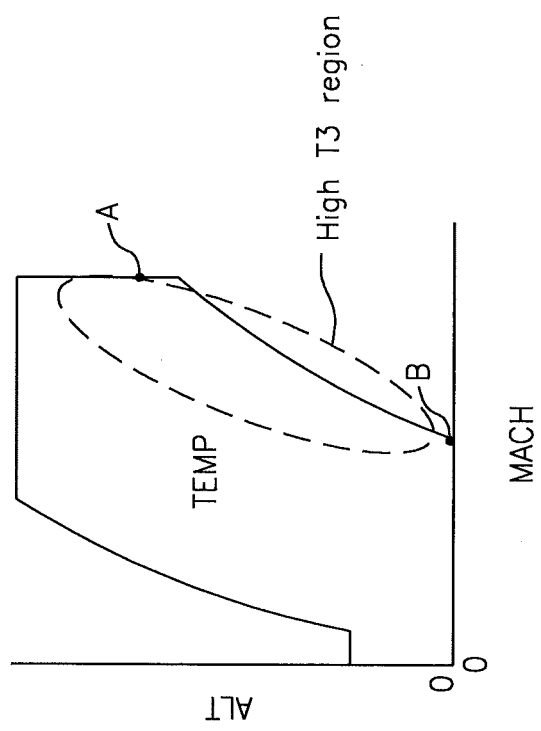
FIG. 7 is a graphical representation of a combustor discharge temperature with respect to an aircraft flight envelope.
Figure 9:
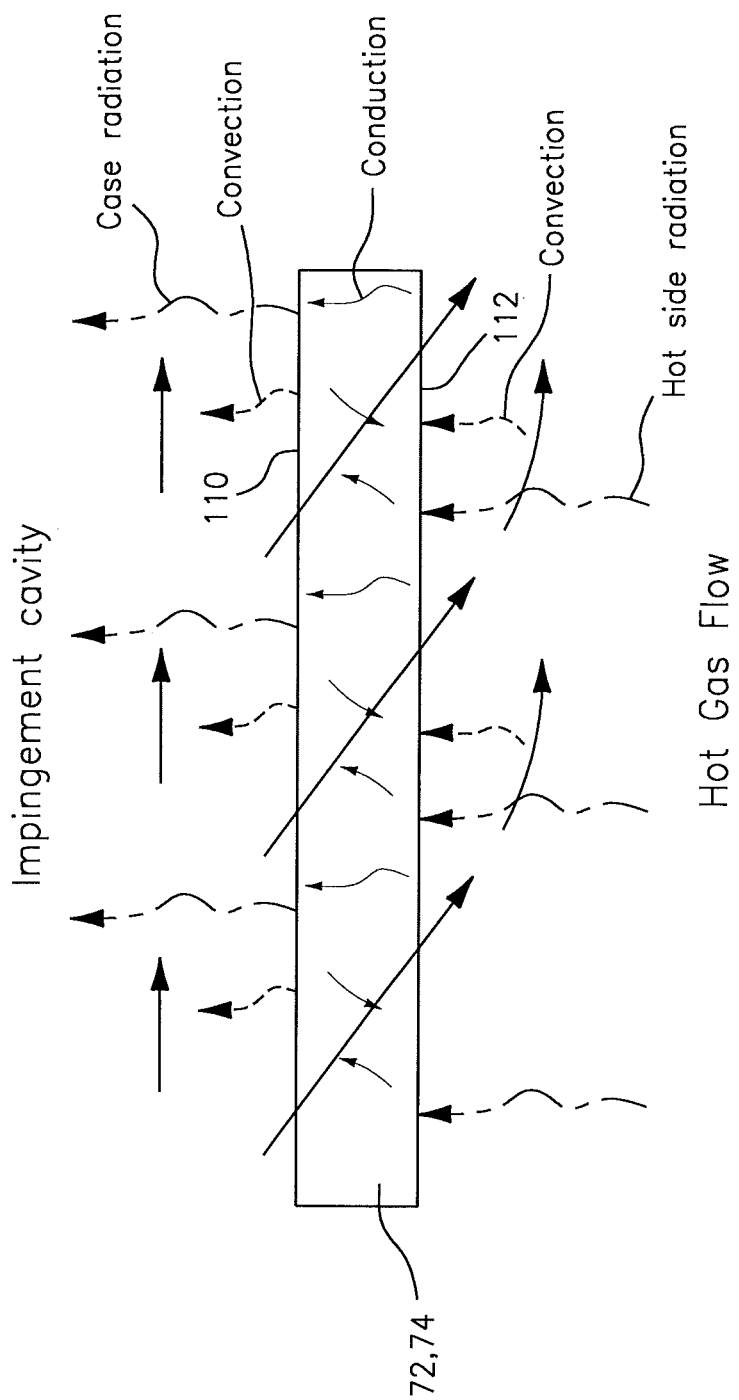
FIG. 9 is a schematic view of the heat transfer mechanisms for a liner assembly.
Figure 10:
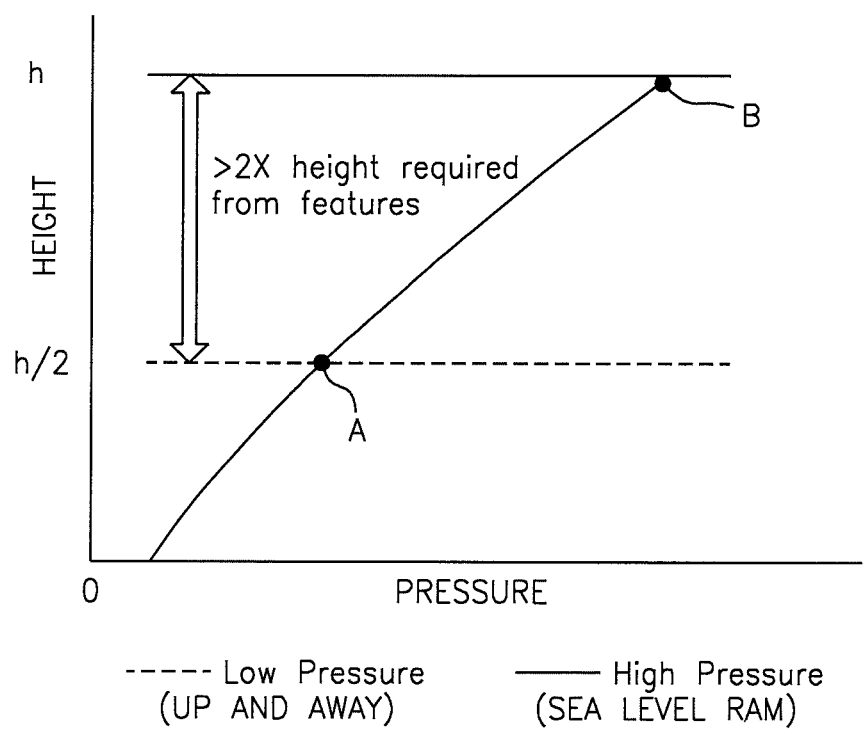
FIG. 10 is a graphical representation of heat transfer driving potential (multiplier) with respect to differential pressure for a liner assembly.
Figure 11:
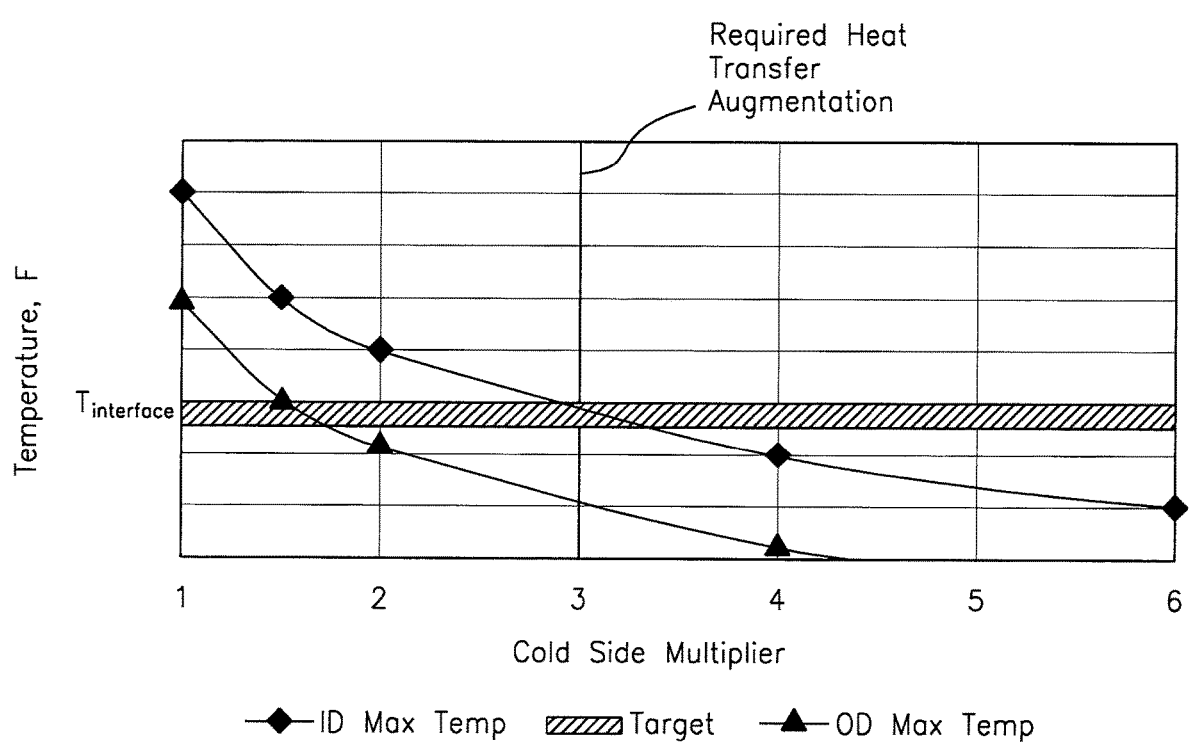
FIG. 11 is a graphical representation of heat transfer driving potential (multiplier)

These engine cycles and architectures also result in a further requirement that the very high compressor exit temperatures (see FIG. 7) exist in concert with a cooling airflow supply pressure decrease (see FIG. 8) at higher altitudes but conventional impingement cooling technology only deliver about 80% of the requirement. That is, available pressures are not sufficient for cooling requirements at high altitudes as the heat transfer capability of the liner panels 72, 74 decrease by a factor of about two (2) as supply pressures decreases from, for example, sea level ram air flight conditions to higher altitude up and away flight conditions (see FIG. 10). The increased internal heat transfer coefficient of, for example, 400° F. (204° C.) at T3 for these engine cycles and architectures thereby indicates a required increased heat transfer multiplier of approximately three hundred percent (300%) to maintain an example target liner panel 72, 74 operational temperature of about 2000 F (1093 C) (FIG. 11).

Figure 6:
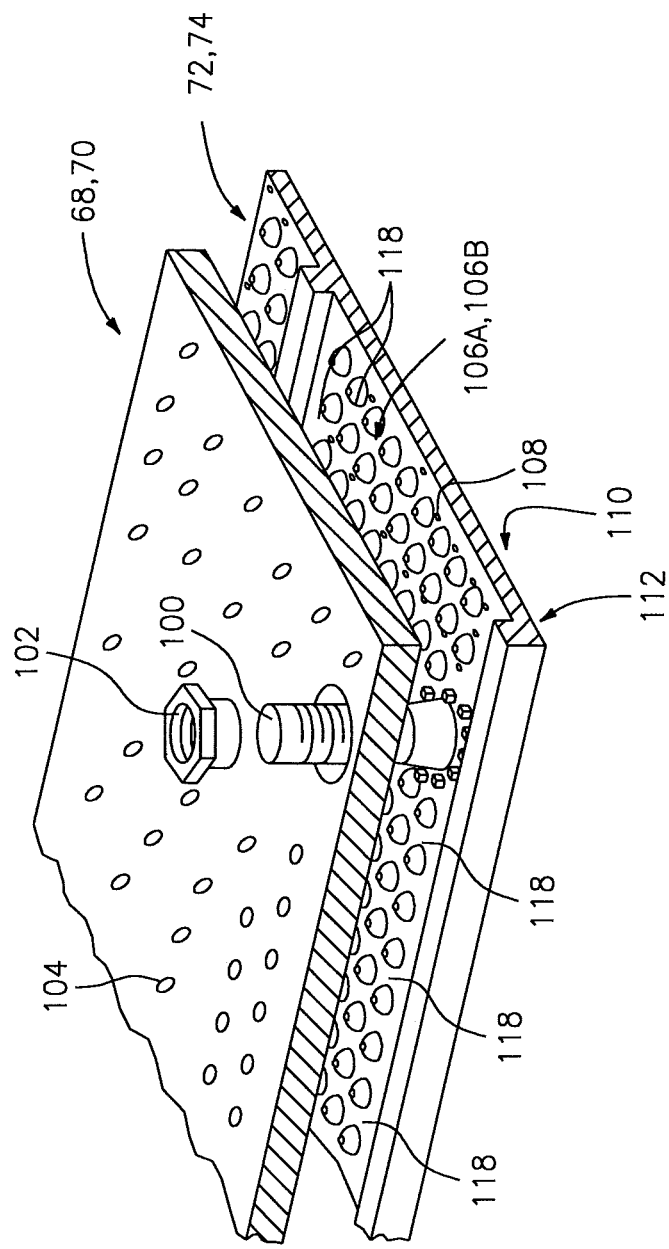
FIG. 6 is an exploded view of a liner assembly of the combustor.

With reference to FIG. 6, a multiple of heat transfer augmentors 118 extends from the cold side 110 of each liner panel 72, 74 to define a heat transfer augmenting geometry. The support shells 68, 70 and liner panels 72, 74 may be manufactured via an additive manufacturing process which beneficially permits ready incorporation of the relatively small heat transfer augmentors 118 as well as the cooling impingement holes 104, the cooling film holes 108 and/or dilution holes 116 during manufacture. One additive manufacturing process includes powder bed metallurgy in which layers of powder alloy such as nickel, cobalt, or other material is sequentially build-up by systems from, for example, Concept Laser of Lichtenfels, Del. and EOS of Munich, Del., e.g. direct metal laser sintering or electron beam melting.

These techniques have layer resolution on the order of 20-50 microns which in adequate to generate well-defined shapes on the order of 0.020-0.100 required to have benefits as heat transfer augmentors 118. Direct Metal Laser Sintering (DMLS) is a free form fabrication, powder-bed manufacturing process. Hardware is built up in a layer-by-layer fashion with a process that starts by slicing a CAD file into 20 μm (0.8 mils) or larger thick layers. This altered CAD file is loaded into the DMLS machine which builds the hardware one layer at a time, as defined by the new CAD file. Electron beam melting (EBM) is a powder bed additive manufacturing process. EBM, however, uses an electron beam to melt powdered metal deposited layer by layer in a vacuum to build up three dimensional parts. A CAD file is sliced into 50 μm or 70 μm (2.0 mils or 2.8 mils) thick layers, stored as STL files, which are then loaded into the EBM machine. An electron beam is created by running a current through a tungsten filament, then creating a potential across it to rip off the electrons. The electrons are steered and focused to the build plate by magnetic fields. The lack of moving parts allows for very fast scanning speeds up to 8000 m/s.

Figure 12:
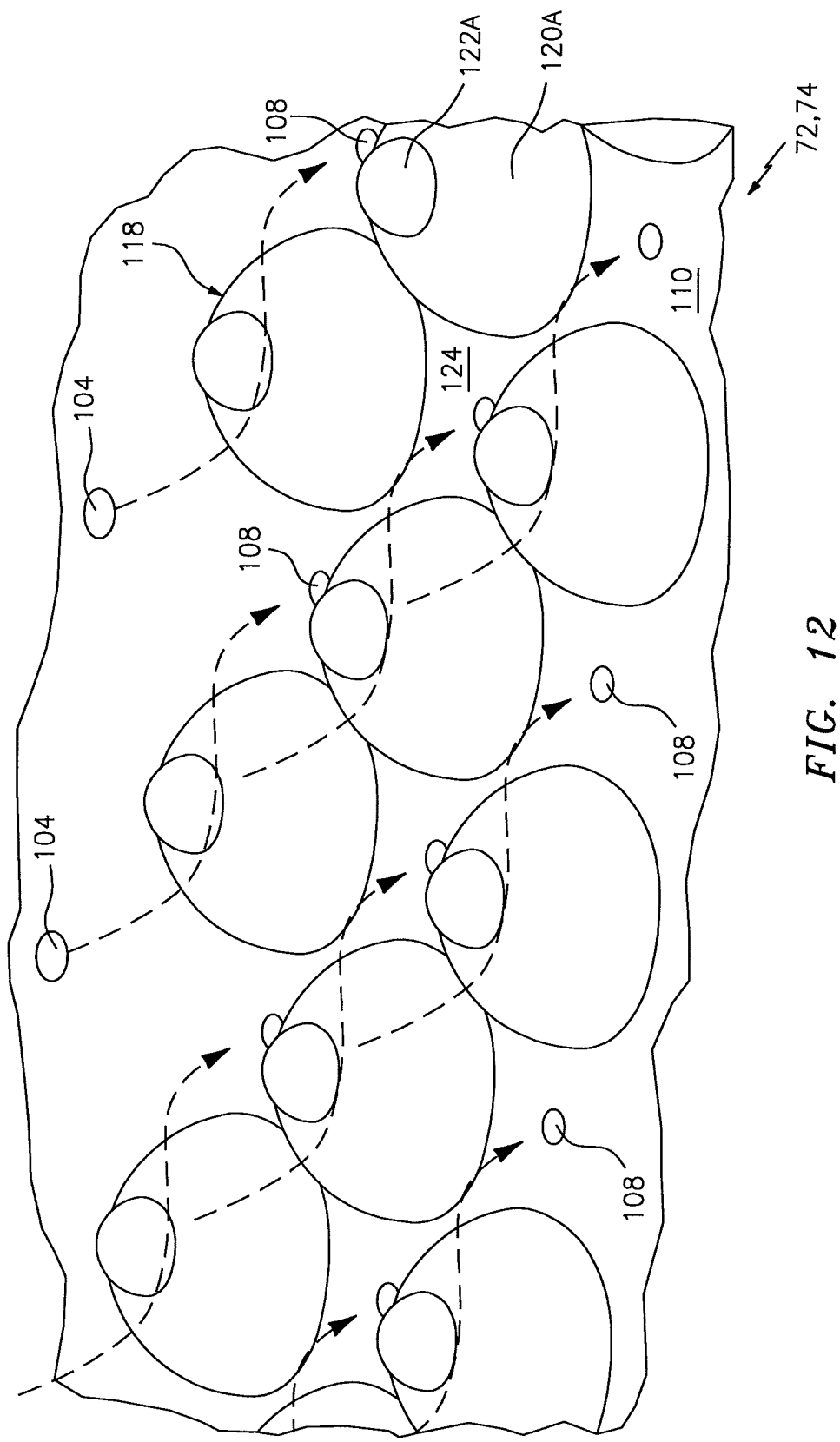
FIG. 12 is a cold side view of a combustor liner panel with a multiple of heat transfer augmentors according to one disclosed non-limiting embodiment.

With reference to FIG. 12, the multiple of heat transfer augmentors 118 generally includes a first heat transfer augmentation feature 120A with a second heat transfer augmentation feature 122A stacked thereon. The stacked arrangement may significantly increase heat transfer. Generally, the second heat transfer augmentation feature 122A is relatively smaller than the first heat transfer augmentation feature 120A.

In one disclosed non-limiting embodiment, the first heat transfer augmentation feature 120A is a generally hemispherical protuberance and the second heat transfer augmentation feature 122A is also a generally hemi-spherical protuberance. The cooling film holes 108 may be located in a valley 124 defined a subset of the multiple of heat transfer augmentor 118. In this disclosed non-limiting embodiment, each cooling film hole 108 is located between each subset of four (4) heat transfer augmentor 118, however, other geometries will benefit herefrom.

Figure 13:
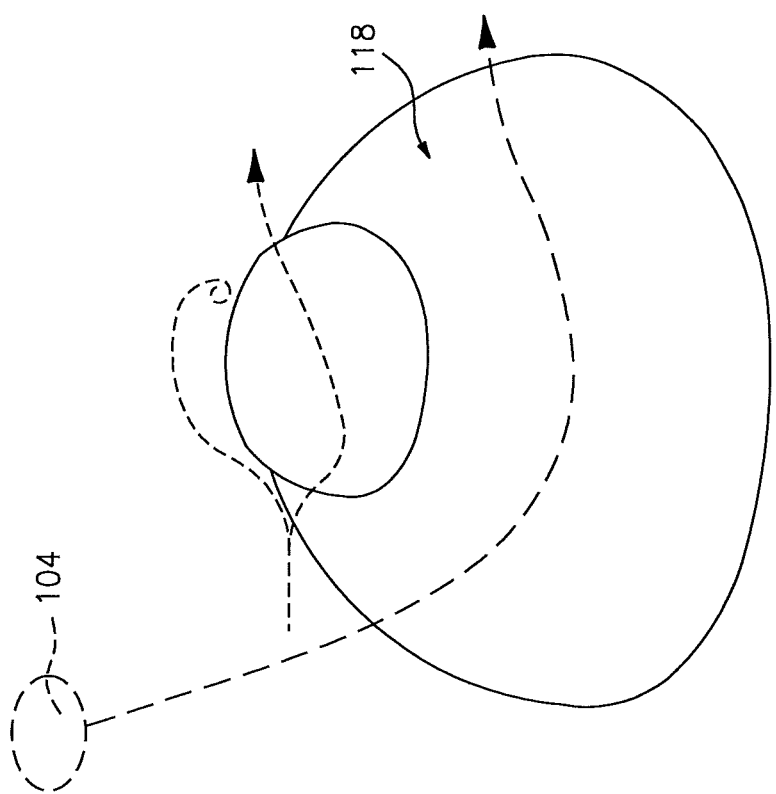
FIG. 13 is a cold side view of one of the multiple of heat transfer augmentors of FIG. 2 with thermal transfer mechanisms overlaid thereon.

The multiple of heat transfer augmentors 118 increase surface area, promote turbulence, increase thermal efficiency, and facilitates film cooling as the spent impingement jet flow flows towards the cooling film holes 108 (see FIG. 13). The heat transfer relies primarily on the surface heat transfer augmentors 118 and its corresponding attributes; however, there are other relevant fluid-flow and energy mechanisms that can be enhanced further. In general, flow transition from the stagnation impingement jet flow to turbulence follows the mechanism associated with turbulence creation through unstable Tollmien-Schiliting waves, three-dimensional instability, then by vortex breakdown in a cascading process which leads to intense flow fluctuations and energy exchange or high heat transfer. This natural process facilitated by the multiple of heat transfer augmentors 118 allow for high energy exchange, produce turbulence, coalescence of turbulence spot assemblies and redirect flow towards more sensitive heat transfer areas, along with flow reattachment. All these factors lead to intense energy transport.

With reference to FIG. 14, in another disclosed non-limiting embodiment, the first heat transfer augmentation feature 120B is a generally hemi-spherical protuberance and the second heat transfer augmentation feature 122B is a partial hemi-spherical protuberance with a flat surface 124B which faces in opposition to a cooling impingement airflow IP from the local cooling impingement holes 104.

With reference to FIG. 15, in another disclosed non-limiting embodiment, the first heat transfer augmentation feature 120C is a generally hemi-spherical protuberance and the second heat transfer augmentation feature 122C is a ramp with a flat surface 124C which faces in opposition to a cooling impingement airflow IP from the local cooling impingement holes 104.

With reference to FIG. 16, in another disclosed non-limiting embodiment, the first heat transfer augmentation feature 120D is a generally hemi-spherical protuberance and the second heat transfer augmentation feature 122D includes a multiple of ramps with flat surfaces 124D which face in opposition to a cooling impingement airflow IP from the local cooling impingement holes 104.

Figure 17:
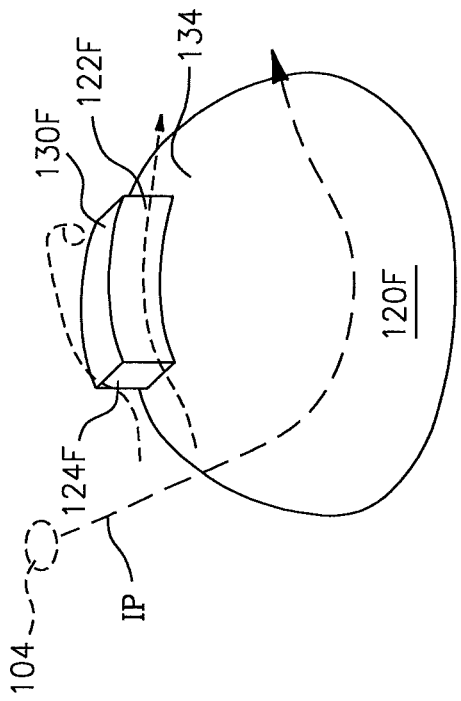
FIG. 17 is a cold side view of a combustor liner panel with one of a multiple of heat transfer augmentors according to another disclosed non-limiting embodiment.

With reference to FIG. 17, in another disclosed non-limiting embodiment, the first heat transfer augmentation feature 120E is a generally hemi-spherical protuberance and the second heat transfer augmentation feature 122E is a rectilinear member with a flat surface 124E which faces in opposition to a cooling impingement airflow IP from the local cooling impingement holes 104. The rectilinear member further includes an upper surface 130E that is generally parallel to a cold side of the support shells 68, 70 (see FIG. 6).

Figure 18:
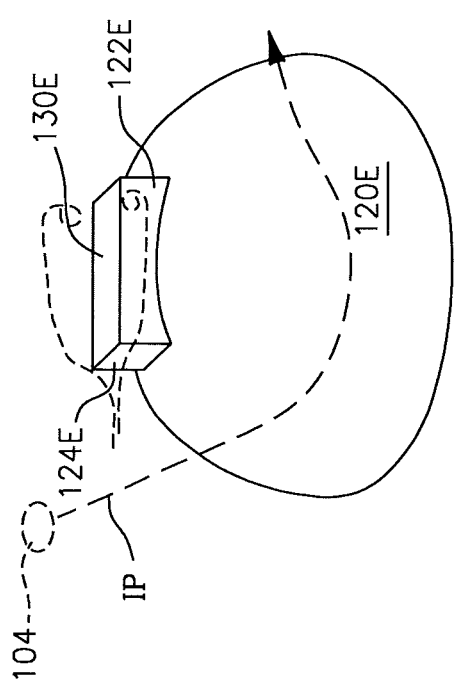
FIG. 18 is a cold side view of a combustor liner panel with one of a multiple of heat transfer augmentors according to another disclosed non-limiting embodiment.

With reference to FIG. 18, in another disclosed non-limiting embodiment, the first heat transfer augmentation feature 120F is a generally hemi-spherical protuberance and the second heat transfer augmentation feature 122F is a contoured rectilinear member with a flat surface 124F which faces in opposition to a cooling impingement airflow IP from the local cooling impingement holes 104. The contoured rectilinear member further includes a contoured upper surface 130F which generally follows an outer surface 134 of the first heat transfer augmentation feature 120F. That is, the contoured surface 130F is generally curved with respect to the cold side of the support shells 68, 70 (see FIG. 6).

Figure 19:
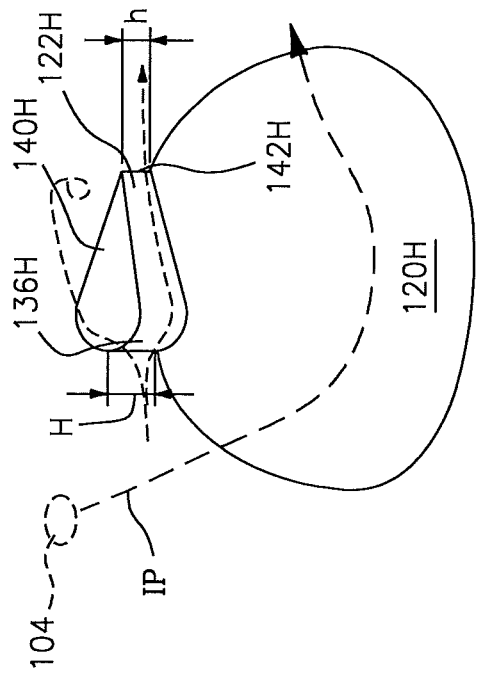
FIG. 19 is a cold side view of a combustor liner panel with one of a multiple of heat transfer augmentors according to another disclosed non-limiting embodiment.

With reference to FIG. 19, in another disclosed non-limiting embodiment, the first heat transfer augmentation feature 120G is a generally hemi-spherical protuberance and the second heat transfer augmentation feature 122G is an airfoil with a leading edge 136G that faces in opposition to a cooling impingement airflow IP from the local cooling impingement holes 104. The airfoil further includes an upper surface 140G that is generally parallel to a cold side of the support shells 68, 70 (see FIG. 6). That is, the leading edge 136G is generally of the same height as the trailing edge 142G.

Figure 20:
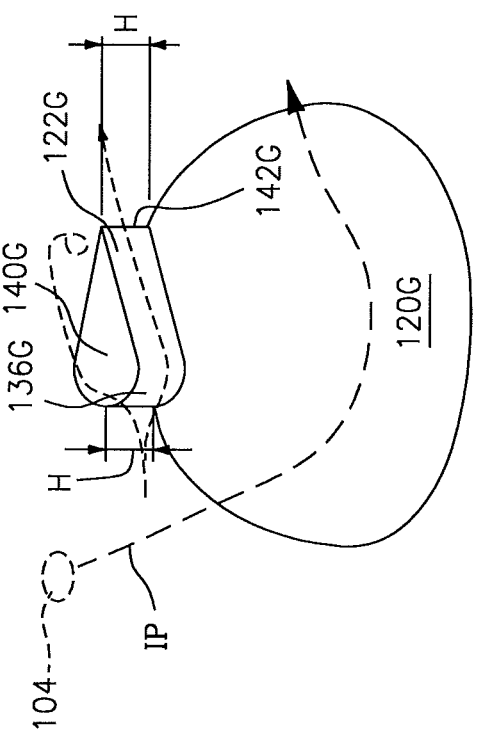
FIG. 20 is a cold side view of a combustor liner panel with one of a multiple of heat transfer augmentors according to another disclosed non-limiting embodiment.

With reference to FIG. 20, in another disclosed non-limiting embodiment, the first heat transfer augmentation feature 120H is a generally hemi-spherical protuberance and the second heat transfer augmentation feature 122H is an airfoil with a leading edge 136H that faces in opposition to a cooling impingement airflow IP from the local cooling impingement holes 104. The airfoil further includes an upper surface 140H that is generally parallel to a cold side of the support shells 68, 70 (see FIG. 6). That is, the leading edge 136H is generally of a greater height than a trailing edge 142H.

It should be appreciated that various combinations, types and sizes of stacked heat transfer augmentation features of geometries may be utilized in combination with effusion holes to achieve maximum cooling with a given amount of cooling air.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A liner panel for a combustor of a gas turbine engine, the liner panel comprising:
    a plurality of heat transfer augmentors comprising a heat transfer augmentor, a second heat transfer augmentor and a third heat transfer augmentor;
    the heat transfer augmentor comprising a first heat transfer augmentation feature and a second heat transfer augmentation feature stacked on the first heat transfer augmentation feature;
    the second heat transfer augmentation feature consisting of a single element projecting out from the first heat transfer augmentation feature; and
    a hole within a valley formed by a subset of the plurality of heat transfer augmentors that comprises the heat transfer augmentor, the second heat transfer augmentor and the third heat transfer augmentor;
    wherein said second heat transfer augmentation feature is a protuberance configured with a flat surface and a partially spherical surface; and
    wherein the flat surface and the partially spherical surface each project out from the first heat transfer augmentation feature to a distal end of the second heat transfer augmentation feature.

2. The liner panel as recited in claim 1, wherein said first heat transfer augmentation feature is a hemi-spherical protuberance.

3. The liner panel as recited in claim 1, wherein the hole is a film cooling hole.

4. The liner panel of claim 1, further comprising a plurality of studs which extend from a cold side of said liner panel.

5. The liner panel of claim 1, wherein the partially spherical surface is a three-dimensionally curved surface.

6. The liner panel of claim 1, wherein the heat transfer augmentor consists of the first heat transfer augmentation feature and the second heat transfer augmentation feature.

7. A liner panel for a combustor of a gas turbine engine, the liner panel comprising:
    a plurality of heat transfer augmentors comprising a heat transfer augmentor, a second heat transfer augmentor and a third heat transfer augmentor;
    the heat transfer augmentor comprising a first heat transfer augmentation feature and a second heat transfer augmentation feature stacked on the first heat transfer augmentation feature;
    the second heat transfer augmentation feature is a single element projecting out from the first heat transfer augmentation feature; and
    a hole within a valley formed by a subset of the plurality of heat transfer augmentors that comprises the heat transfer augmentor, the second heat transfer augmentor and the third heat transfer augmentor;

wherein said second heat transfer augmentation feature is a ramp configured with a flat surface and a curved surface; and wherein the flat surface is disposed at an upstream end of the ramp, and the curved surface tapers towards the first heat transfer augmentation feature as the ramp extends away from the upstream end to a downstream end of the ramp.

8. The liner panel of claim 7, wherein the first heat transfer augmentation feature is a hemi-spherical protuberance.

9. The liner panel of claim 7, wherein the hole is a film cooling hole.

10. The liner panel of claim 7, further comprising a plurality of studs which extend from a cold side of said liner panel.

11. The liner panel of claim 7, wherein the heat transfer augmentor consists of the first heat transfer augmentation feature and the second heat transfer augmentation feature.

12. A liner panel for a combustor of a gas turbine engine, the liner panel comprising:

a plurality of heat transfer augmentors comprising a heat transfer augmentor, a second heat transfer augmentor and a third heat transfer augmentor;

the heat transfer augmentor comprising a first heat transfer augmentation feature and a second heat transfer augmentation feature stacked on the first heat transfer augmentation feature; and a hole within a valley formed by a subset of the plurality of heat transfer augmentors that comprises the heat transfer augmentor, the second heat transfer augmentor and the third heat transfer augmentor;

wherein said second heat transfer augmentation feature is an airfoil that projects out from the first heat transfer augmentation feature to a distal end surface configured with a teardrop shaped geometry; and wherein the airfoil has a curved surface at a leading edge of the airfoil with respect to a cooling airflow flowing along the liner panel, and a height of the airfoil tapers towards the first heat transfer augmentation feature as the airfoil extends away from the leading edge towards a trailing edge of the airfoil.

13. The liner panel of claim 12, wherein the first heat transfer augmentation feature is a hemi-spherical protuberance.

14. The liner panel of claim 12, wherein the hole is a film cooling hole.

15. The liner panel of claim 12, further comprising a plurality of studs which extend from a cold side of said liner panel.

16. The liner panel of claim 12, wherein the heat transfer augmentor consists of the first heat transfer augmentation feature and the second heat transfer augmentation feature.

* * * * *